United States Patent [19]

Howell

[11] 4,026,147
[45] May 31, 1977

[54] THRUST MALALIGNMENT MEASUREMENT APPARATUS

[75] Inventor: Thomas H. Howell, Huntsville, Ala.

[73] Assignee: The United States of America as represented by the Secretary of the Army, Washington, D.C.

[22] Filed: Mar. 26, 1976

[21] Appl. No.: 670,604

[52] U.S. Cl. .............................................. 73/117.4
[51] Int. Cl.² ......................................... G01L 5/13
[58] Field of Search ................................. 73/117.4

[56] References Cited
UNITED STATES PATENTS

| | | | |
|---|---|---|---|
| 2,472,108 | 6/1949 | Hickman | 73/117.4 X |
| 3,139,750 | 7/1964 | Smith et al. | 73/117.4 |
| 3,375,712 | 4/1968 | Postma | 73/117.4 |
| 3,408,861 | 11/1968 | Webb | 73/117.4 |
| 3,788,130 | 1/1974 | Ormond | 73/117.4 |

Primary Examiner—James J. Gill
Attorney, Agent, or Firm—Nathan Edelberg; Robert P. Gibson; Harold W. Hilton

[57] ABSTRACT

Apparatus for suspending a rocket vertically in a three degree gimbal which only restrains the thrust vector. The gimbal will accomodate rotation of the attitude (thrust) vector in the pitch, yaw and roll planes. The attitude vector (orientation, velocity, and acceleration) is a function of applied moments about the origin. The quality of the attitude vector measurement is most critical and it can be measured to the following precision.

orientation (± ¼ milliradian)— optical lever technique or shaft encoders (18–20 bits); angular rate (± 5–10 milliradians/second) — rate gyros or superjet angular; acceleration (±0.1–0.2 radian/sec²) — control accelerometers.

An annular ring forms a restraint for anomalies.

6 Claims, 2 Drawing Figures

THRUST MALALIGNMENT MEASUREMENT APPARATUS

BACKGROUND OF THE INVENTION

The present invention utilizes the principles of Euler's Theorem which states that when a rigid body moves in such a manner that one point, O, remains fixed in space, it can be shown that the resulting displacement is a rotation about some axis through O.

The asymmetric flow within a rocket's nozzle will produce a turning moment on the body. In free rocket applications, the target miss distance can be correlated to the magnitude of this parameter, i.e. thrust malalignment. It has been commonly accepted within this discipline that it is attached or fixed to the body coordinate system and has been treated accordingly in the analyses. Designers have imposed severe mechanical tolerances on the metal parts to assure that this parameter is within an acceptable limit, less than one milliradian for most free rockets. Often the propulsion system specification treats this source empirically and provides acceptance criteria via inspection of metal parts in a quasistatic environment. This practice has been adopted because the measurement standards are insensitive to the side thrust produced. In other words, the delivered side impulse is submerged within the noise level and it is not readily discernable.

A quality measurement of this parameter has eluded designers and test engineers. Significant resources have been expended just to investigate this source. Likewise, many concepts have been evaluated by industry and governmental agencies. These concepts have included 2°, 3° and 6°-of-freedom test stands and most users conclude that a 1 mil measurement precision is highly unlikely. This uncertainty is predominantly caused by cross component frequency coupling. This frequency phenomena is caused by inherent deflection of load strut assemblies which do not register a signal without an attendant deflection. Best results have been obtained when the load struts were placed in a set of orthogonal axes. Typically, each load strut will deflect 0.010–0.020 inch under full scale design load, and each strut contains a pair of flexures to assure only axial loading of the sensor. Unfortunately, the pitch, yaw, and roll frequencies will be near the same quantity. There are three common problems with this type of a test stand and are as follows:

1. Alignment of the test specimen to the reference coordinate system,
2. Calibration required to define the interaction coefficients of the system, and,
3. Frequency cross coupling between the components.

The rocket's ignition sequence usually excites the spring mass system such that the actual side thrust (malalignment) which is contained within the frequency spectrum is not discernible. This problem is magnified with short burn time and high thrust motors, especially, when there is little damping with the system. Data assessment is extremely complex and often the evaluator is left with much latitude during interpretation.

SUMMARY OF THE INVENTION

Apparatus for suspending a test vehicle from a swivel joint so as to give it freedom to roll, yaw and pitch. The apparatus includes a thrust restraining support member having a three degree gimbal spherical bearing secured thereto to which the tip of the missile is attached (or any other convenient attachment). An annulus restraining ring is disposed about the base of the vehicle to prevent undue excursions in the event of gross thrust malalignment.

Apparatus for measuring the attitude vector (orientation, rate, and acceleration) includes optical lever or shaft encoders to provide angular resolution of ¼ milliradian. "Superjets" or rate gyros to provide angular rate within 5–10 milliradians per second and control accelerometers to read the angular acceleration less than a ±0.1–0.2 radian per second $^2$.

DESCRIPTION OF THE PREFERRED EMBODIMENTS

Figure 1:
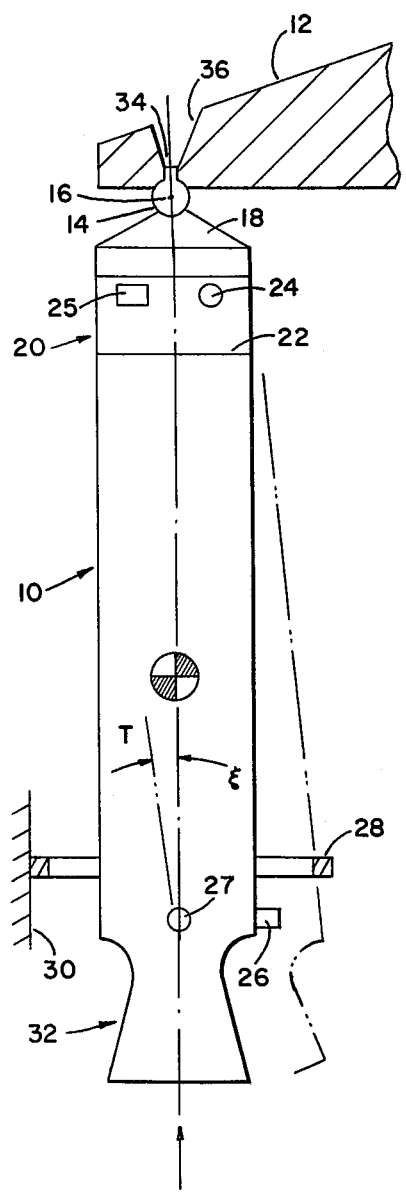
FIG. 1 is a diagrammatic side view of the three degree rotating test stand of the present invention.

As seen in FIG. 1, a rocket motor 10 is suspended from a thrust restraining support member 12 having a 3° gimbal spherical bearing 14 secured therein. A shaft angle encoder 16 is secured to the bearing to measure an angular displacement, in a manner well known in the art.

To secure motor 10 to the bearing, a thrust adaptor 18 is provided which in turn is secured to a rate sensing instrument package 20 which is secured to the forward end 22 of motor. The rate sensing instrument package houses a pair of rate sensors 24 and 25 for providing signals indicative of the angular rate. These sensors may be rate gyros or superjets manufactured by Hamilton Standard. The superjet senses inertial acceleration based on the principle of Cariolis Acceleration. The sensors are mounted in orthogonal relation and parallel to the spin axis.

A pair of control accelerometers 26 and 27 are mounted on the vehicle to measure the angular acceleration. These are conventional accelerometers as used in present missile systems and are mounted in orthogonal relation and perpendicular to the spin axis. The accelerometers measure the angular acceleration within ±0.1–0.2 radians per second $^2$.

An annulus restraining ring 28 is secured to a support 30 and surrounds the base 32 of the vehicle to form a restraint against undue excursions in the event of gross thrust malalignment.

To align the vehicle for the testing thereof an optical flat 34 is provided on the spherical bearing. Support 12 includes an optical window 36 through which the optical flat may be sighted for alignment to the test vehicle. The mirror is adjusted for normalcy to the spin axis of the vehicle. The alignment is accomplished by autoreflection in conventional manner usng a theodolite, or other suitable optical equipment.

Figure 2:
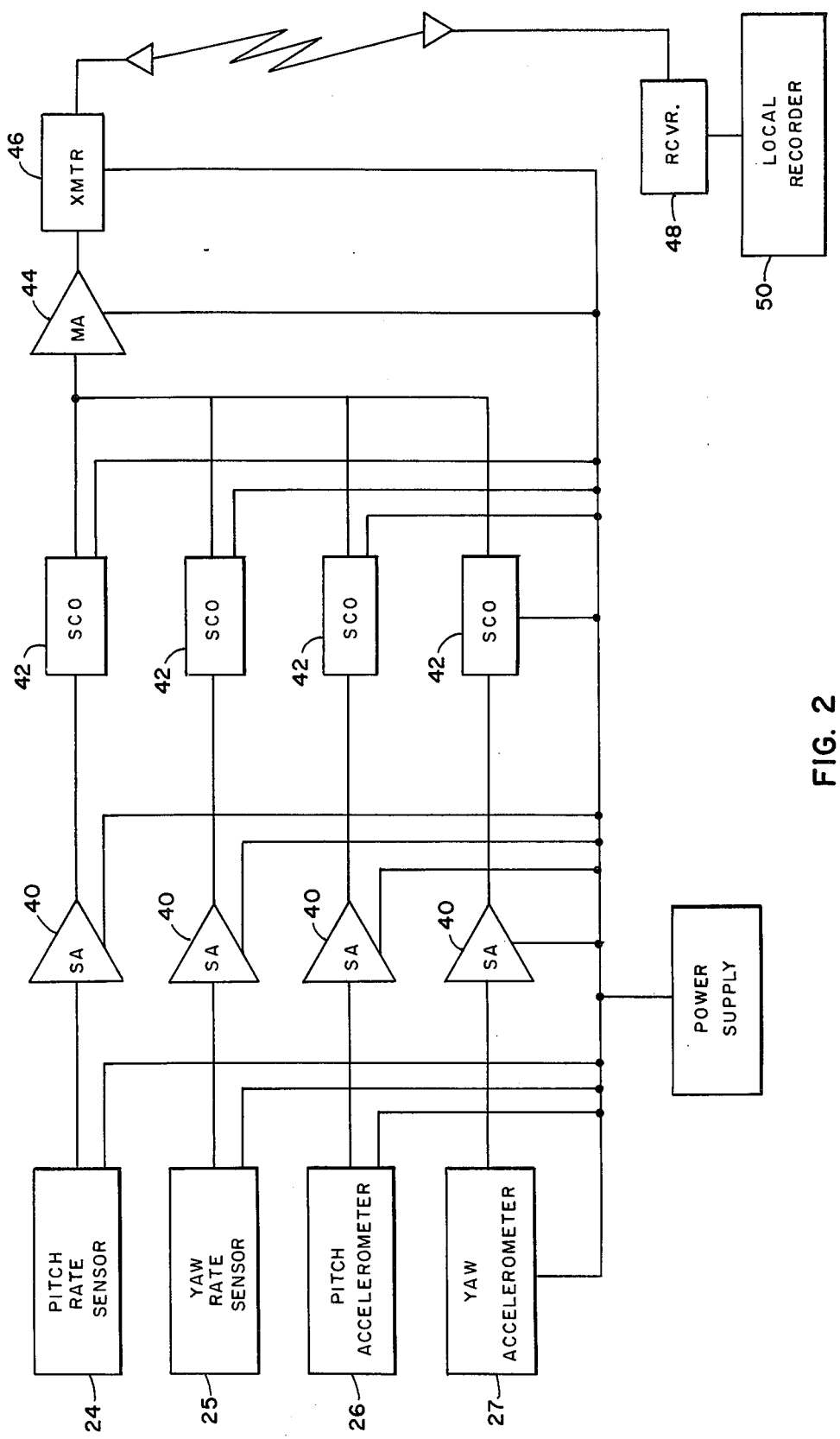
FIG. 2 is a diagrammatic view of the data transmission components for attitude vector readout.

FIG. 2 illustrates the data transmission apparatus. The orientation measurement devices (optical lever or shaft encoders), the rate measurement devices (gyros or superjet) and the acceleration measurement devices (accelermeters) are carried on-board. The outputs signals of the onboard instruments are received by scaling amplifiers 40 and transmitted for conditioning to subcarrier oscillators 42, (such as Omnitek Model 30) and then to mixing amplifier 44 (such as Omnitek 30M). The signals are then transmitted by transmitter 46 to receiver 48 to be recorded on a local recorder 50.

I claim:

1. Apparatus for aligning and measuring thrust malalignment of a rocket comprising:
   a. a support;
   b. a 3° gimbal spherical bearing rotatably secured in said support;
   c. orienting means carried by said spherical bearing for providing signals indicative of angular displacement of said rocket responsive to rocket motor ignition;
   d. means for vertically suspending said rocket to said gimbal bearing; and
   e. means for measuring the attitude vector of said rocket responsive to rocket motor ignition including rate sensing means for providing signals indicative of angular rate, and, accelerometer means carried on said rocket for providing signals indicative of angular acceleration; and,
   f. means for receiving and recording said signals.

2. Apparatus as in claim 1 including means for alignment of said rocket motor relative to a reference line prior to ignition of said motor.

3. Apparatus as in claim 2 including a restraining ring disposed about the base of said motor to restrain said motor from excess side movement during ignition of said motor.

4. Apparatus as in claim 1 including a thrust adaptor member secured to said gimbal bearing and a rate sensing instrument package secured to said motor and said thrust adaptor member.

5. Apparatus as in claim 4 wherein said orienting means includes shaft encoder means cooperating with said gimbal bearing and said rocket.

6. Apparatus as in claim 4 wherein said orienting menas includes optical lever means cooperating with said gimbal bearing and said rocket.

* * * * *